United States Patent
Monroe et al.

(10) Patent No.: US 6,697,421 B1
(45) Date of Patent: Feb. 24, 2004

(54) OPERATOR INDEPENDENT, TRANSPARENT WIRELESS MODEM MANAGEMENT

(75) Inventors: Daniel Richard Monroe, Woodland Park, CO (US); Gregory Allan Rea, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/444,044

(22) Filed: Nov. 19, 1999

(51) Int. Cl.$^7$ ................................ H04B 7/00
(52) U.S. Cl. ............... 375/222; 370/315; 455/426.1; 455/426.2; 455/73; 455/557; 709/217; 709/223
(58) Field of Search ............... 375/211, 219, 375/220, 222; 709/217, 223; 455/426.1, 426.2, 73, 555, 557; 370/315

(56) References Cited

U.S. PATENT DOCUMENTS

| | | | |
|---|---|---|---|
| 3,656,112 A | 4/1972 | Paull | 340/151 |
| 4,388,690 A | 6/1983 | Lumsden | 364/483 |
| 4,578,540 A | 3/1986 | Borg et al. | 179/2 |
| 4,646,084 A | 2/1987 | Burrowes et al. | 340/870.03 |
| 5,295,178 A | 3/1994 | Nickel et al. | 379/58 |
| 5,434,911 A | 7/1995 | Gray et al. | 379/106 |
| 5,436,960 A | 7/1995 | Campana, Jr. et al. | 379/58 |
| 5,451,938 A | 9/1995 | Brennan, Jr. | 340/870.14 |
| 5,461,558 A | 10/1995 | Patsiokas et al. | 364/145 |
| 5,475,867 A | 12/1995 | Blum | 455/53.1 |
| 5,481,259 A | 1/1996 | Bane | 340/870.03 |
| 5,493,287 A | 2/1996 | Bane | 340/825.52 |
| 5,537,458 A | 7/1996 | Suomi et al. | 379/59 |
| 5,559,870 A | 9/1996 | Patton et al. | 379/107 |
| 5,590,179 A | 12/1996 | Shincovich et al. | 379/107 |
| 5,617,084 A | 4/1997 | Sears | 340/870.02 |
| 5,619,508 A | 4/1997 | Davis et al. | 370/495 |
| 5,631,636 A | 5/1997 | Bane | 340/825.69 |
| 5,640,155 A | 6/1997 | Springer | 340/870.28 |
| 5,663,933 A | 9/1997 | Eitrich | 368/119 |
| 5,673,252 A | 9/1997 | Johnson et al. | 370/94.1 |
| 5,684,472 A | 11/1997 | Bane | 340/870.02 |
| 5,726,646 A | 3/1998 | Bane et al. | 340/870.03 |
| 5,778,024 A | 7/1998 | McDonough | 375/216 |
| 5,809,415 A | 9/1998 | Rossmann | 455/422 |
| 6,014,089 A | 1/2000 | Tracy et al. | 340/870.02 |
| 6,625,439 B2 * | 9/2003 | Laybourn et al. | 455/407 |
| 2002/0191635 A1 * | 12/2002 | Chow et al. | 370/463 |

FOREIGN PATENT DOCUMENTS

| | | | |
|---|---|---|---|
| EP | 0849682 | 6/1998 | G06F/13/10 |

OTHER PUBLICATIONS

Morassi et al, "Real Time Simulation of Fax Transmission on the Transparent GSM Data Service", 5th IEEE International Symposium on Personal, Indoor and Mobile Radio Communications, 1994, pp. 944–953.

Bolton, "The Cellular Way to Retrieve Data", Transmission & Distribution, 1994, pp. 54, 57, 59.

Murch et al, "Cellular Data Service Over GSM", Telecommunications, 1995, pp. 63–71.

Anonymous, "GSM Modules for Remote Applications", Electronic Times, 1998.

Orr, "Cell Phones Act as Modems", Computer Dealer News, 1994, p. 33.

\* cited by examiner

*Primary Examiner*—Amanda T. Le
(74) *Attorney, Agent, or Firm*—Blakely, Sokoloff, Taylor & Zafman LLP

(57) ABSTRACT

An operator independent, transparent wireless modem management system is disclosed. According to an embodiment of the invention, the modem management system comprises the steps of receiving a short message service message at the wireless modem and examining the short message service message for modem management information. If the short message service message comprises modem management information, then the wireless modem processes the short message service message. A wireless modem for accomplishing the same is also disclosed.

22 Claims, 7 Drawing Sheets

GPRS CLASS C

OPERATOR INDEPENDENT, TRANSPARENT WIRELESS MODEM MANAGEMENT

CROSS REFERENCE TO RELATED APPLICATION

This application is related to U.S. patent application Ser. No. 09/444,020, entitled "EVENT DETECTION AND NOTIFICATION MODEM", filed on the same day herewith, now abandoned, which is incorporated herein by reference in its entirety.

BACKGROUND OF THE INVENTION

1. Field of the Invention

The invention relates generally to wireless modems, and more particularly to remote management of a wireless modem.

2. Background

Existing GSM modems operate, for setup and control purposes, similarly to known landline modems, such as Hayes compatible modems. Such modems generally act primarily as a transport mechanism for moving data between two devices, such as a client computer and a head-end server. In particular, the modem is configured to passively modulate data or control signals from the client computer or to passively push modulated signals through the modem to the client computer.

When a modem is initialized, it will generally run either from a default modem configuration, which is stored in the modem, or the modem will receive a special initialization configuration parameters from the client computer. The initialization configuration is performed, in either mode, to ensure that the modem is able to communicate with the client computer and, preferably, operate (as a transport) at its maximum efficiency.

FIG. 1 shows a typical communication network 100 employing a wireless modem. A laptop computer is the client computer 104. The client computer 104 is connected, for example through an RS-232 port and serial cable 106, to a GSM modem 108. In turn, the GSM modem 108 is coupled to a GSM network 112 via over-the-air interface 110. The GSM network 112 is coupled to a head-end server 116, such as an application server, via a short message service center interface 114.

As data flow 150 illustrates, when a client computer 104 tries to connect to the head-end server 116, it will first try to initialize the GSM modem 108 by passing configuration parameters directly to the GSM modem 108. For example, configuration parameters 120 are passed to the GSM modem 108 over the serial cable 106 from the client computer 104. A response 124, indicating whether the parameters were accepted, is then sent by the GSM modem 108 back to the client computer 104. Once the GSM modem 108 is initialized, it essentially becomes a slave to the client computer 104 and functions as a passive transport carrying data 128 from the client computer 104 to the head-end server 116, in addition to data 132 from the head-end server 116 to the client computer 104.

SUMMARY OF THE INVENTION

An operator independent, transparent wireless modem management system is disclosed. According to an embodiment of the invention, the modem management system comprises the steps of receiving a short message service message at the wireless modem and examining the short message service message for modem management information. If the short message service message comprises modem management information, then the wireless modem processes the short message service message.

A wireless modem is also disclosed, the wireless modem comprises electronic hardware and software for implementing a wireless protocol. A processor in the wireless modem is preferably configured to handle signals from an external device over an interface, and is also configured to handle one or more short message service messages delivered over a RF transceiver, the short message service messages comprising modem management information.

BRIEF DESCRIPTION OF THE DRAWINGS

The figures of the accompanying drawings are depicted by way of example and not by way of limitation, in which like reference numerals refer to like elements.

DETAILED DESCRIPTION OF THE PREFERRED EMBODIMENTS

The present invention comprises methods and techniques for operator independent, transparent wireless modem management using short message services. The invention is preferably embodied in methods and techniques in a wireless modem, although aspects of the invention can also be implemented in a remote (or "head-end") server. The invention preferably allows for the wireless modem to function not only as a slave device to a client computer, as in the past, but as an intelligent processing device. Furthermore, the wireless modem is configured to allow remote initialization of configuration parameters via short message service messages. The short message service messages can contain data that not only initializes the wireless modem's operating parameters, but data that calls other commands or applications executing internally or externally to the wireless modem. For example, the methods and techniques allow remote initialization of event detection and notification algorithms internal to the wireless modem. In another example, the methods and techniques allow remote initialization or control of a device external to the wireless modem, for example a utility meter, a vending machine, or other user equipment.

Figure 1:
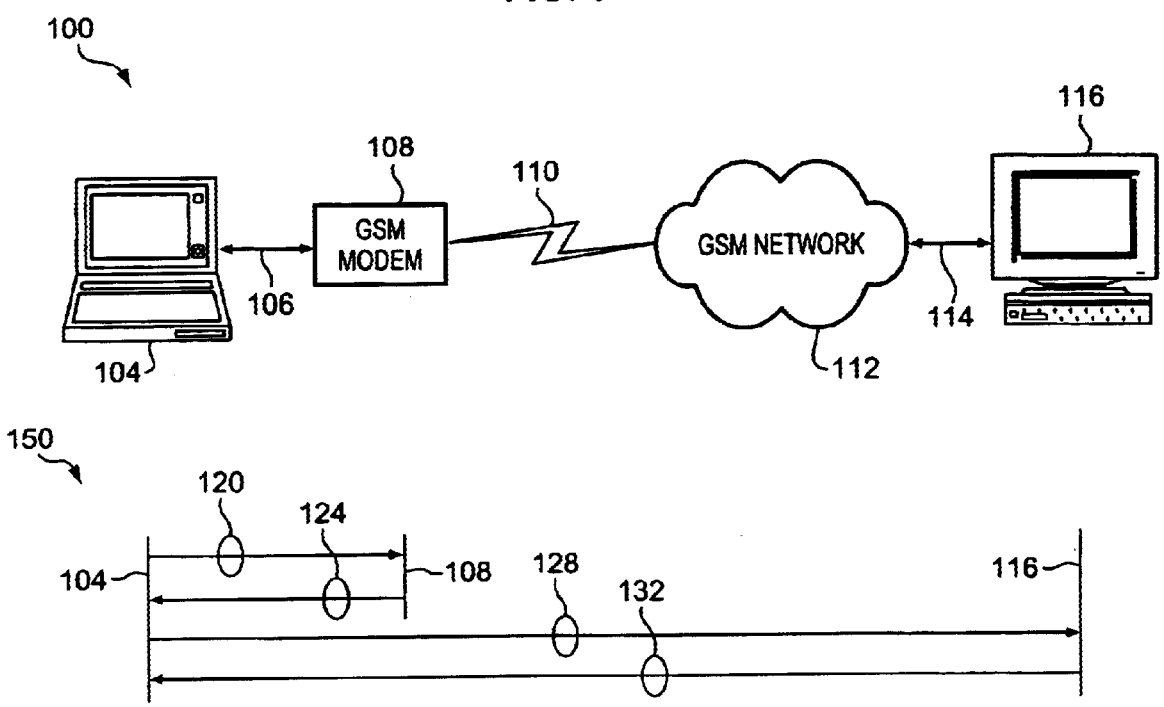
FIG. 1 shows a typical communication network and data flow.
Figure 2:
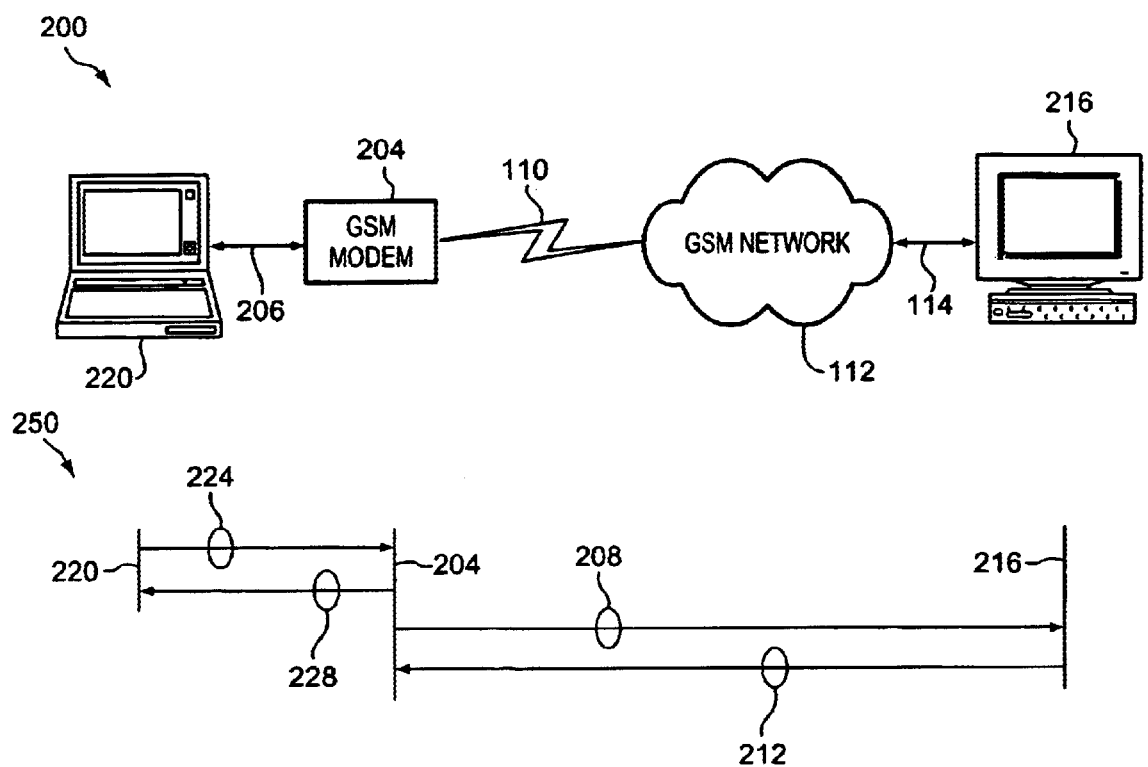
FIG. 2 shows a communication network and data flow according an embodiment of the present invention.

FIG. 2 depicts an exemplary network 200 that employs the present invention. User equipment 220 is connected via a serial cable or other line 206 (hereinafter "line 206") to a wireless modem 204, preferably a global system for mobile communications (hereinafter "GSM") or general packet radio service (hereinafter "GPRS")-type modem. Although user equipment 220 is depicted as a laptop computer, it can be a less sophisticated or more limited functionality form of user equipment such as a utility meter, a meter concentration point, a utility meter control system, a substation monitor, telemetry equipment, or a vending machine.

The wireless modem 204 is coupled to a wireless network 112, for example a GSM or GPRS network, via an overthe-air interface 110. The wireless network 112 is in turn coupled through a short message service center interface 114 to a head-end server 216. The head-end server 216 differs from head-end server 116 in that it is configured to send the SMS messages to the wireless modem 208, the SMS messages including the wireless modem management information. No special programming is required, however, on the head-end server 216, as only the ASCII strings that comprise a standard SMS message need to be modified (as will be apparent in the description below, in particular with reference to Table 1).

A data flow diagram 250, also in FIG. 2, shows possible communications flows between the wireless modem 204 and the user equipment 220, or the head-end server 216. It is noted that data and configuration parameters can now pass to or from both the user equipment 220 and the head-end server 216. For example, data and configuration parameters 224 can be passed from the client computer 220 to the wireless modem 204. Similarly, data and configuration parameters 228 can pass from the wireless modem 204 to the client computer 220. Even more significantly, data and initialization parameters 212 can be sent from the head-end server 216 to the wireless modem 204, just as data and initialization parameters 208 can be sent from the wireless modem 204 to the head-end server 216. By overlaying the short message service management methods and techniques described herein, the wireless modem 204, in effect, can operate as an intelligent bridge between the user equipment 220 and the head-end server 216, thereby facilitating communication and control between legacy devices and a wireless network.

Figure 3:
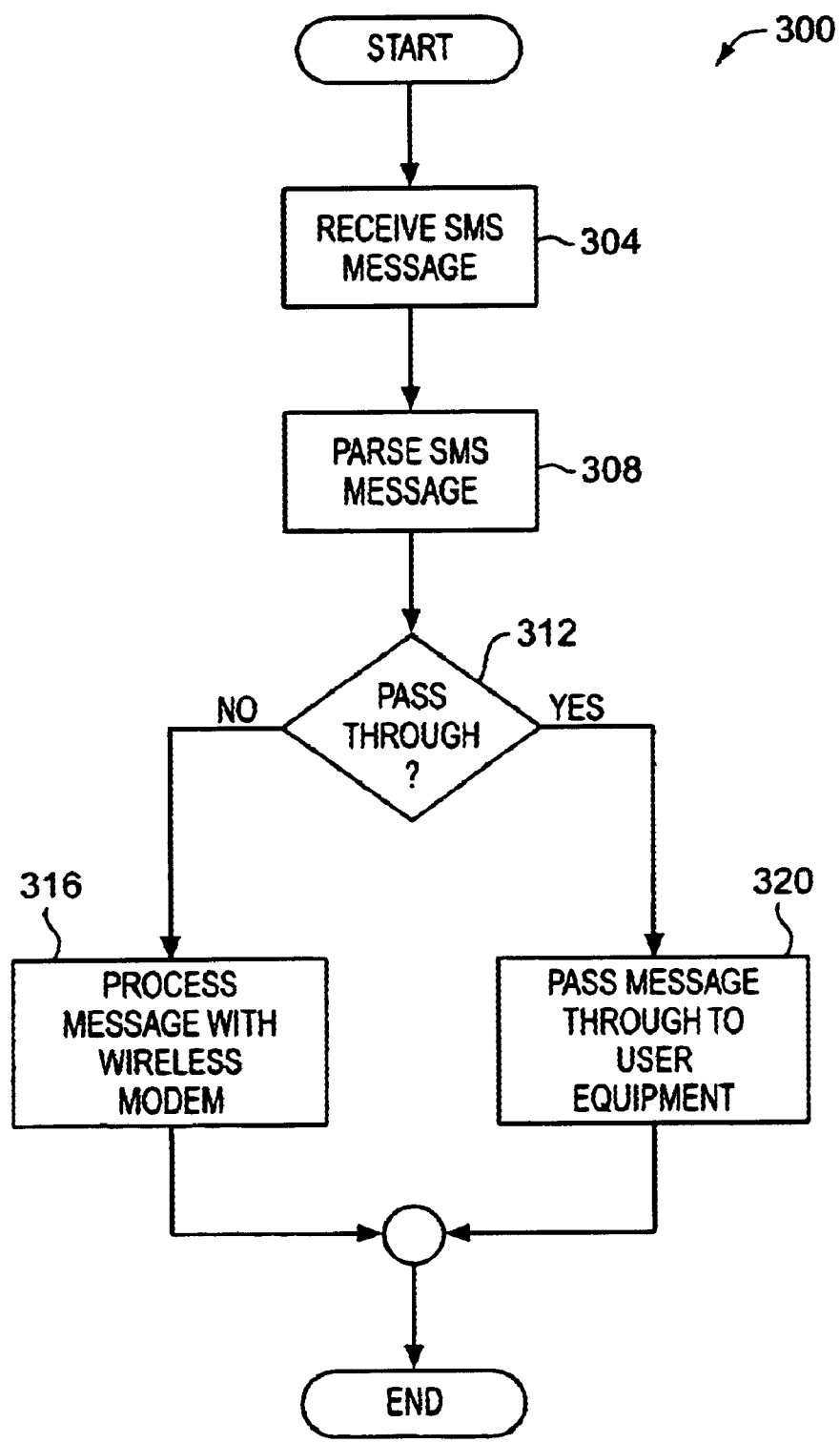
FIG. 3 is a flowchart depicting the steps for a presently preferred short message service modem management process.

FIG. 3 depicts a presently preferred embodiment of a short message service modem management algorithm 300. In step 304, an SMS message is received at the wireless modem 204 originating from the head-end server 216. The inbound SMS message is parsed in step 308 and the results of the parse are stored in a memory of the wireless modem 204. In step 312, the data parsed from step 308 is tested for a known command or indicator to determine whether the SMS message should be processed internally by the wireless modem 204, or externally by the user equipment. For example, by comparing the stored data to a command lookup table or a particular sequence of characters (e.g., "+++AT") that indicate the SMS message is for modem management purposes.

If, as a result of testing in step 312, a modem management command is recognized, then the SMS message is processed by a particular routine in the wireless modem in step 316. However, if testing in step 312 indicates that the SMS message should be passed through the wireless modem 204, then in step 320 the SMS message is passed through to the user equipment 220.

After either step 316 or step 320, the initial processing terminates. It is noted, however, that processing likely involves further steps or specific functions that don't involve the actual handoff or identification of inbound SMS messages. Since such specific processing steps are generally beyond the scope of the invention, they are not further detailed hereinafter, rather, in step 516 it is simply noted that the wireless modem processes the SMS message appropriately. In most cases, the same routines that handle data or commands from the user equipment 220 (for example the notification algorithms or other routines, as are described in U.S. patent application Ser. Nos. 09/44,020, which has been incorporated herein by reference in its entirety, and, entitled "DATA TERMINAL APPARATUS", filed Sep. 20, 1999, which is now incorporated herein by reference in its entirety) are used to handle data and commands passed from the head-end server 216 by way of SMS messaging.

For example, additional commands can include directing a processor in the wireless modem 204 to check the quality of an RF signal detected at an RF transceiver, or to select a particular RF channel over the over-the-air interface will communicate certain information with the wireless modem. Further still, the commands can include directing a processor to retrieve a call history file or log that describes the calls sent from or received by the wireless modem 204.

Figure 4:
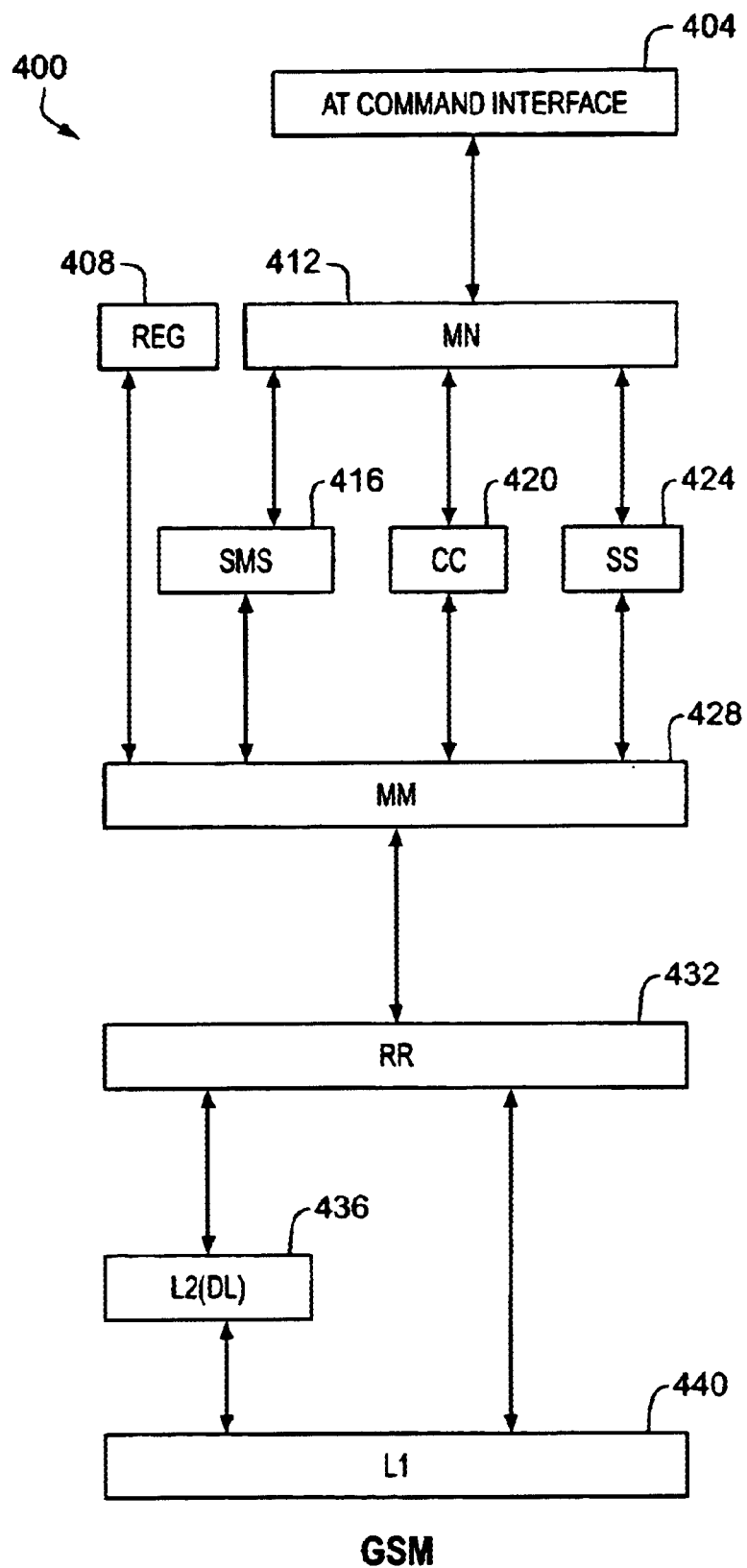
FIGS. 4–6 depict embodiments of wireless protocol stacks.
Figure 5:
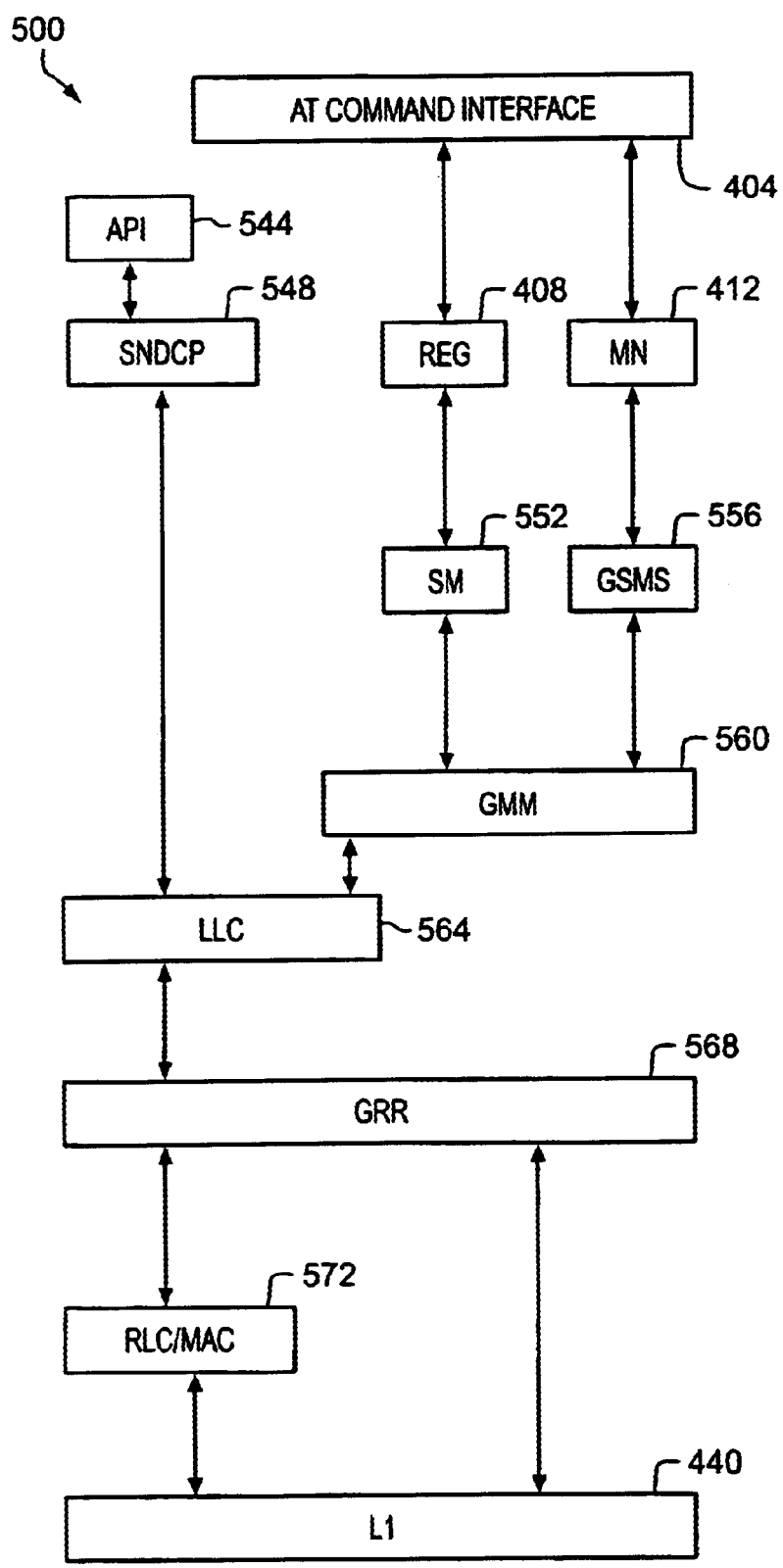
Figure 6:
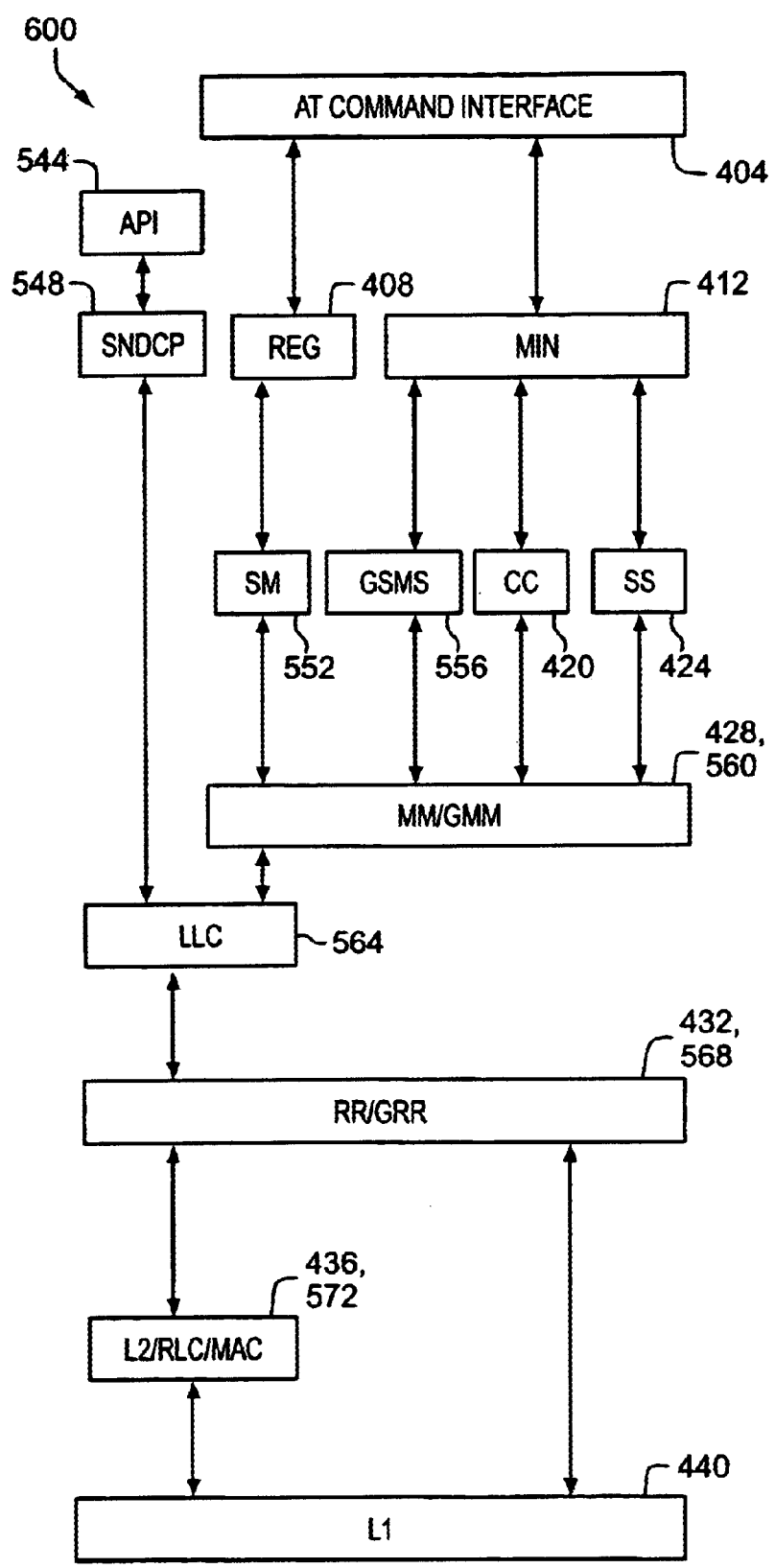

FIGS. 4–6 depict embodiments of exemplary wireless protocol stacks employed by the wireless modem 204. It is noted that existing software stacks, such as the GSM protocol stack 400, can be modified in accordance with the present invention by overlaying the SMS modem management software over the existing stack. In particular, the AT command interface 404 can be modified, as well as the mobile network interface 412.

For example, the AT command interface 404 can be adapted to handle specific functions or commands. Table 1 illustrates exemplary commands that a presently preferred AT command interface includes.

TABLE 1

| | |
|---|---|
| +++AT~LOGON=[password] | logs a user on to the wireless modem and allows other mobile management functions to be executed |
| +++AT~LOGOFF | logs a user off the wireless modem or disables mobile management functions |
| +++AT~PWD=[password] | changes the existing password |
| +++AT[command] | modem management command identifier |

As for the mobile network layer 412, the parser software code (step 308 in FIG. 3) is preferably implemented here. Thus, the mobile network layer 412 intercepts inbound SMS messages (step 304), parses them (step 308), and determines (step 312) whether they are normal SMS messages, in which case they are passed through to the user equipment 220 (step 320), or they are modem management type messages and must be passed on to the AT command interface 404 (step 316).

A general description of the remainder of the wireless protocol is now appropriate. The mobile network man-machine interface (MN) 412 (in addition to the functionality described above) receives data (for example from the AT command interface 404) and passes the data to the appropriate messaging service—e.g., a short message service (SMS) 416, a call control service (CC) 420, or a supplementary service (SS) 424. A registration element 408 will provide the mobility management layer 428 with necessary information about the data and the GSM network. From each of layers 408, 416, 420 and 424 data flow is then directed to and from the mobility management layer (MM) 428.

The mobility management layer 428 establishes, maintains, and releases connections with the GSM network. From the mobility management layer 428, data and control is passed to the radio resource management layer (RR) 432. The radio resource management layer 432 establishes physical connections over the radio interface (for example RF transceiver 120) for call-related signaling and traffic channels with a base station in the GSM network.

Connected to the radio resource management layer 432 is the physical layer (L1) 440. The physical layer 440 processes call-related signaling and traffic channels directly from the radio resource layer 432, and also processes the data sent from the data link layer (L2) 436.

FIG. 5 is substantially similar to FIG. 4, however, the "G" notation in the protocol stack layers indicates that the designated layers now refer to a general packet radio service (GPRS). GPRS uses a packet radio principle and can be used for carrying packet data protocol to or from the GSM network. GPRS provides additional services beyond what is offered with a standard GSM network, for example, GPRS can provide increased over-the-air data transfer rates and packet lengths.

An application program interface (API) 544 is added to GPRS Class C protocol stack 500 to allow an application to control the subnetwork dependent convergence protocol (SNDCP) 548, which is responsible for segmentation and re-assembly of data packets, encryption and decryption, and transmission control protocol (TCP) header and data compression.

Layers interfacing the AT command interface 404 include the registration layer 408 and mobile network man-machine interface layer 412, which in turn interface the SM layer 552 and GSMS (GPRS short message service) 556. The SM layer 552 and GSMS layer 556 interface the GPRS mobility management (GMM) layer 560, and both the GMM-layer 560 and SNDCP layer 548 interface the link layer control (LLC) 564, which handles the link layer information of the packet data. It is noted that the SM layer 552 is the short message service layer—that is, like SMS layer 416, short messages are passed over a GSM control channel. This is in contrast to GSMS layer 556, where short messages are passed over a packet channel (thus, greater packet size and increased speed as compared to using the GSM control channel).

Link layer control 564 interfaces the GPRS resource management layer (GRR) 568. GPRS resource management layer 568 in turn interfaces medium access control/radio link control (RLC/MAC) layer 572, which handles the physical link processing, as well as physical layer 440.

FIG. 6 shows the GPRS Class A protocol stack 600. The protocol stack 600 is a merge of the GSM protocol stack 400 (FIG. 4) and the GPRS Class C protocol stack 500 (FIG. 5), which is denoted by the dual reference numbers annotating the various layers of the protocol stack. The GPRS Class A protocol stack can operate standard GPRS and other GSM services simultaneously.

Figure 7:
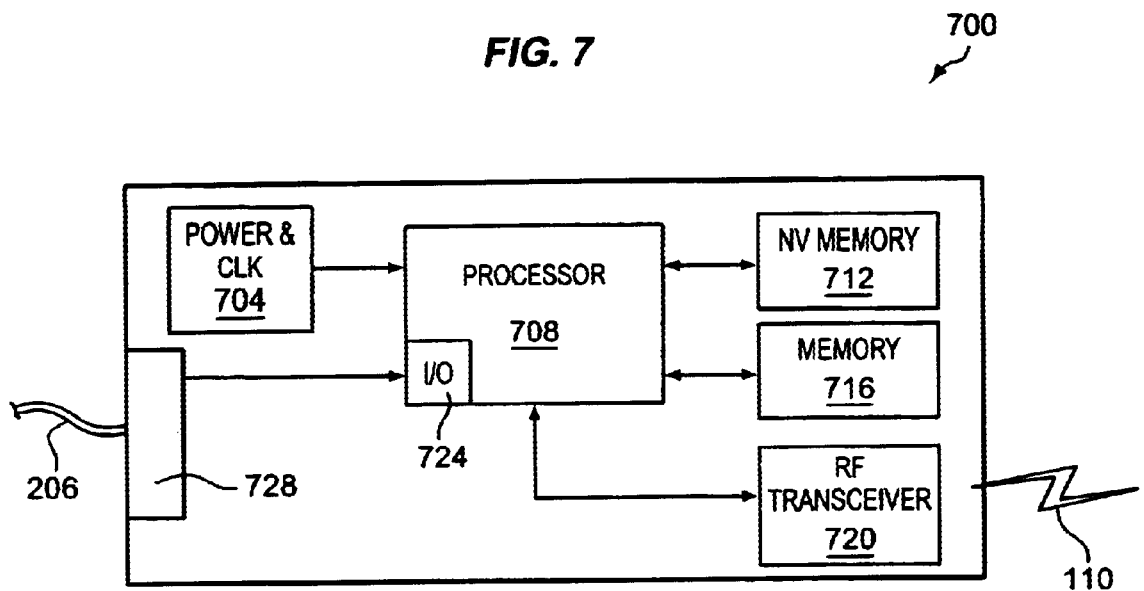
FIG. 7 is an embodiment of a presently preferred wireless modem.

FIG. 7 is a block diagram of electronic hardware that can function as a wireless modem 700, for example wireless modem 208. Wireless modem 700 includes power and clock circuitry 704. Preferably a power and ground plane are part of a printed circuit board that supports the electronic hardware. The clock signal is shown connected to a processor 708, although it can also be provided to the other elements comprising modem 700.

A non-volatile memory 712, for example an electrically alterable but persistent memory such as flash memory or EEPROM, is communicatively coupled to the processor 708. The non-volatile memory 712 preferably holds software that is executed by the processor 708 including, but not limited to global system for mobile communications (hereinafter "GSM") protocol stack software and wireless modem management software (described above). A volatile memory 716, such as a random access memory, is also coupled to the processor 708. The volatile memory 716 preferably holds temporary program variables and other information used in a run-time environment, that is, when processor 708 is executing the GSM protocol stack software, the wireless modem management software, or other functions in the wireless modem 700.

A RF radio, or RF transceiver 720 is also coupled to the processor 708. The RF transceiver 720 handles physical modification;of data and control signals for transmission to or reception from the over-the-air interface 110. Over-the-air interface 110 communicates with a base station (not shown) which is part of a GSM or GPRS network (not shown). General wireless communication standards such as GSM and GPRS are known in the art and thus it is not necessary that they be described in further detail here.

According to one embodiment, the processor 708 includes one or more I/O ports 724, for example interrupt inputs and/or serial data ports. The I/O ports 724 can be part of the processor 708, or they can be part of communications chip (e.g., a MAXIM Integrated Products, Sunnyvale, Calif., part no. MAX 202E) that is coupled to the processor 708. A receptacle 728, for receiving a line 206 from the user equipment 220, is communicatively coupled to the processor 708 through the I/O port 724.

The various methods and techniques described herein are preferably implemented by way of one or more sequences of instructions stored in a computer-readable medium, such as a non-volatile memory communicatively coupled to one or more processors in the wireless modem. The sequences of instructions can be precompiled (as in the case of object code), or they can be interpreted instructions passed though the SMS messages. Furthermore, the methods can be implemented in a variety of programming languages, such as C, C++, assembly, Perl, or BASIC. As for the data and configuration parameters that are passed through the SMS messages, they can be implemented in text script that resembles a modified AT command set, or other programming languages such as the languages mentioned above.

As a result of the methods and techniques described herein, the wireless modem can be transformed from merely a transport device, to an intelligent processing device. The invention is a significant improvement over conventional modems, as it can integrate legacy equipment that has little or no processing ability, with a GSM or other wireless network and allow remote management and control from a head-end server. The invention thus allows for operator independent and transparent (vis-a-vis the user equipment) modem management capabilities—capabilities that allow the remote extension of the functionality of the wireless modem, since the SMS message can include program code that can execute on the wireless modem.

What is claimed is:

1. A wireless modem comprising:
   a processor;
   a memory coupled to said processor, said memory comprising a software stack configured to hold one or more sequences of instructions for causing said processor to handle a wireless protocol;
   a RF transceiver coupled to said processor; and
   an interface coupled to said processor, said interface configured to receive signals from an external device; wherein
   said processor is configured to handle said signals from said external device over said interface, and wherein said processor is further configured to handle one or more short message service messages delivered over said RF transceiver, said short message service messages comprising modem management information.

2. The wireless modem of claim 1, wherein said modem management information comprises wireless modem configuration parameters.

3. The wireless modem of claim 1, wherein said modem management information includes a command for wireless modem to perform a function stored internally to said wireless modem.

4. The wireless modem of claim 1, wherein said processor handles said one or more short message service messages received over said RF transceiver by parsing data from one or more said short message service messages, testing said parsed data for a modem management command indictor, and processing said short message service message if said modem management command indicator is detected.

5. The wireless modem of claim 1, wherein said wireless protocol is a global system for mobile communications protocol.

6. The wireless modem of claim 1, wherein said wireless protocol is a general packet radio services protocol.

7. A method for wireless modem management comprising the steps of:
   receiving a short message service message at a wireless modem;
   examining said short message service message for modem management information;
   processing said short message service message at said wireless modem if said short message service message comprises said modem management information; and
   passing said short message service message through said wireless modem if said short message service message does not comprise said modem management information.

8. The method of claim 7, said step of examining comprising the steps of:
   parsing said short message service message;
   testing said parsed short message service message for a modem management command indicator, said command indicator indicating whether said short message service message includes said modem management information; and
   signaling to a processor in said wireless modem that a command is waiting to be executed if said processing designator is found.

9. The method of claim 7, wherein said step of processing said short message service message at said wireless modem includes initializing said wireless modem based upon said modem management information contained in said short message service message.

10. The method of claim 7, wherein said step of processing said short message service message at said wireless modem includes the step of checking a quality of a wireless signal detected at said wireless modem.

11. The method of claim 7, wherein said step of processing said short message service message at said wireless modem includes the step of handling a request for a call log history.

12. The method of claim 7, wherein said step of processing said short message service message at said wireless modem includes the step of selecting a RF channel for wireless communications on said wireless modem.

13. The method of claim 7, wherein said step of processing said short message service message at said wireless modem includes the step of authenticating a party sending short message service messages to said wireless modem.

14. The method of claim 7, wherein said step of processing said short message service message at said wireless modem includes the step of initializing communication parameters for event detection and notification.

15. A computer-readable medium comprising one or more sequences of instructions configured to cause a processor to perform steps for modem management in a wireless modem, said one or more sequences of instructions comprising the steps of:
   receiving a short message service message at a wireless modem;
   examining said short message service message for modem management information;
   processing said short message service message at said wireless modem if said short message service message comprises said modem management information; and
   passing said short message service message through said wireless modem if said short message service message does not comprise said modem management information.

16. The computer-readable medium of claim 15, said step of examining comprising the steps of:
   parsing said short message service message;
   testing said parsed short message service message for a modem management command indicator, said command indicator indicating whether said short message service message includes said modem management information; and
   signaling to a processor in said wireless modem that a command is waiting to be executed if said processing designator is found.

17. The computer-readable medium of claim 15, wherein said step of processing said short message service message at said wireless modem includes initializing said wireless modem based upon said modem management information contained in said short message service message.

18. The computer-readable medium of claim 15, wherein said step of processing said short message service message at said wireless modem includes the step of checking a quality of a wireless signal detected at said wireless modem.

19. The computer-readable medium of claim 15, wherein said step of processing said short message service message at said wireless modem includes the step of handling a request for a call log history.

20. The computer-readable medium of claim 15, wherein said step of processing said short message service message at said wireless modem includes the step of selecting a RF channel for wireless communications on said wireless modem.

21. The computer-readable medium of claim 15, wherein said step of processing said short message service message at said wireless modem includes the step of authenticating a party sending short message service messages to said wireless modem.

22. The computer-readable medium of claim 15, wherein said step of processing said short message service message at said wireless modem includes the step of initializing communication parameters for event detection and notification.

* * * * *